(12) United States Patent
Lonkar et al.

(10) Patent No.: US 11,595,489 B2
(45) Date of Patent: *Feb. 28, 2023

(54) SELECTING CONTENT FOR HIGH VELOCITY USERS

(71) Applicant: Snap Inc., Santa Monica, CA (US)

(72) Inventors: Chinmay Lonkar, Playa Vista, CA (US); David Taitz, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/215,128

(22) Filed: Mar. 29, 2021

(65) Prior Publication Data

US 2021/0218821 A1 Jul. 15, 2021

Related U.S. Application Data

(63) Continuation of application No. 15/805,952, filed on Nov. 7, 2017, now Pat. No. 10,986,194.

(Continued)

(51) Int. Cl.
*H04L 67/50* (2022.01)
*G06Q 50/00* (2012.01)
(Continued)

(52) U.S. Cl.
CPC .......... *H04L 67/535* (2022.05); *G06Q 50/01* (2013.01); *H04L 51/10* (2013.01); *H04L 51/52* (2022.05);
(Continued)

(58) Field of Classification Search
CPC ............... H04W 52/0258; H04L 67/02; H04L 65/4069; H04L 67/14; H04L 65/4084;
(Continued)

(56) References Cited

U.S. PATENT DOCUMENTS 10,986,194 B2   4/2021 Lonkar et al.
2009/0192870 A1* 7/2009 White ............... G06Q 30/0201
                                                          705/7.29

(Continued)

FOREIGN PATENT DOCUMENTS

CN      110800013 A    2/2020
KR      102292447 B1   8/2021
WO   WO-2019006395 A1  1/2019

OTHER PUBLICATIONS

"European Application Serial No. 18752887.2, Summons to Attend Oral Proceedings dated Mar. 30, 2021", 12 pgs.

(Continued)

*Primary Examiner* — Hitesh Patel
(74) *Attorney, Agent, or Firm* — Schwegman Lundberg & Woessner, P.A.

(57) ABSTRACT

Disclosed are systems, methods, and computer-readable storage media to select content to present to a user are disclosed. In one aspect, a method includes determining a content consumption rate of the user, and selectively presenting content to the user based on the content consumption rate. The content consumption rate may be determined based on a number of media content presented to the user over a period of time. If the number is above a threshold, a first type of content may be presented, while if the number is below (or equal) to the threshold, a second type of content, or in some aspects, no content, may be presented. After the selective presentation, additional content may be presented regardless of the content consumption rate.

20 Claims, 11 Drawing Sheets

Related U.S. Application Data

(60) Provisional application No. 62/527,832, filed on Jun. 30, 2017.

(51) Int. Cl.

| | | |
|---|---|---|
| *H04L 51/10* | (2022.01) | |
| *H04L 51/52* | (2022.01) | |
| *H04L 67/01* | (2022.01) | |
| *H04L 67/568* | (2022.01) | |
| *H04L 65/1063* | (2022.01) | |

(52) U.S. Cl.
CPC .......... *H04L 65/1063* (2013.01); *H04L 67/01* (2022.05); *H04L 67/568* (2022.05)

(58) Field of Classification Search
CPC . H04L 47/25; H04L 41/0896; G06F 3/04883; H04N 21/44222; H04N 21/44213; H04N 21/4667
See application file for complete search history.

(56) References Cited

U.S. PATENT DOCUMENTS

| | | | | |
|---|---|---|---|---|
| 2011/0060649 | A1* | 3/2011 | Dunk | .................... H04L 67/535 |
| | | | | 707/E17.107 |
| 2014/0115181 | A1 | 4/2014 | Wu | |
| 2016/0021202 | A1 | 1/2016 | Peterson et al. | |
| 2016/0285802 | A1 | 9/2016 | Brandenburg et al. | |
| 2017/0366628 | A1* | 12/2017 | Devkar | ............... G06F 16/9535 |
| 2018/0367626 | A1 | 12/2018 | Azout et al. | |
| 2019/0007507 | A1 | 1/2019 | Lonkar et al. | |

OTHER PUBLICATIONS

"European Application Serial No. 18752887.2,Response filed Feb. 22, 2021 to Communication pursuant to Article 94(3) EPC dated Oct. 13, 2020", 12 pgs.
"International Application Serial No. PCT/US2018/040438, International Preliminary Report on Patentability dated Jan. 9, 2020", 9 pgs.
"Korean Application Serial No. 10-2020-7002730, Response filed Jan. 6, 2021 to Notice of Preliminary Rejection dated Nov. 6, 2020", w/ English Claims, 27 pgs.
"U.S. Appl. No. 15/805,952, Final Office Action dated Feb. 6, 2020", 13 pgs.
"U.S. Appl. No. 15/805,952, Non Final Office Action dated Jun. 5, 2020", 16 pgs.
"U.S. Appl. No. 15/805,952, Non Final Office Action dated Oct. 11, 2019", 13 pgs.
"U.S. Appl. No. 15/805,952, Notice of Allowability dated Jan. 15, 2021", 6 pgs.
"U.S. Appl. No. 15/805,952, Notice of Allowance dated Dec. 17, 2020", 13 pgs.
"U.S. Appl. No. 15/805,952, Response filed Jan. 6, 2020 to Non Final Office Action dated Oct. 11, 2019", 8 pgs.
"U.S. Appl. No. 15/805,952, Response filed Mar. 24, 2020 to Final Office Action dated Feb. 6, 2020", 8 pgs.
"U.S. Appl. No. 15/805,952, Response filed Aug. 5, 2020 to Non Final Office Action dated Jun. 5, 2020", 9 pgs.
"Content delivery network", Wikipedia (Online), URL: https://en.wikipedia.org/w/index.php?title=Content_delivery_network&oldid=787776136, (Jun. 27, 2017), 4 pgs.
"Europears Application Serial No. 18752887.2, Communication pursuant to Article 94(3) EPC dated Oct. 13, 2020", 8 pgs.
"European Application Serial No. 18752887.2, Response filed Aug. 14, 2020 to Communication Pursuant to Rules 161(1) and 162 EPC dated Feb. 6, 2020", 15 pgs.
"Google Cast", Wikipedia (Online), URL: https://en.wikipedia.org/w/index.php?title=Google_Cast&oldid=783784280, (Jun. 4, 2017), 7 pgs.
"International Application Serial No. PCT/US2018/040438, International Search Report dated Sep. 10, 2018", 7 pgs.
"International Application Serial No. PCT/US2018/040438, Written Opinion dated Sep. 10, 2018", 9 pgs.
"Korean Application Serial No. 10-2020-7002730, Notice of Preliminary Rejection dated Nov. 6, 2020", w/ English Translation, 13 pgs.
"Media Source Extension", Wikipedia (Online), URL: https://en.wikipedia.org/w/index.php?title=Media_Source_Extensions&oldid=779605135, (May 9, 2017), 3 pgs.
"Mobile Web", Wikipedia (Online), URL: https://en.wikipedia.org/w/index.php?title=Mobile_web&oldid=787492356, (Jun. 25, 2017), 5 pgs.
"Social television", Wikipedia (Online), URL: https://en.wikipedia.org/w/index.php?title=Social_television&oldid=787518118, (Jun. 25, 2017), 6 pgs.
"SoundCloud", Wikipedia (Online), URL: https://en.wikipedia.org/w/index.php?title=SoudCloud&oldid=788007454, (Jun. 28, 2017), 7 pgs.
"Streaming media", Wikipedia (Online), URL: https://en.wikipedia.org/w/index.php?title=Streaming_media&oldid=787229420, (Jun. 24, 2017), 10 pgs.
Elliott, Matt, "How to turn off YouTube's new autoplay feature", CNET (Online), URL: https://www.cnet.com/how-to/how-to-turn-off-youtubes-new-autoplay-feature/, (Mar. 20, 2015), 2 pgs.
Kent, "How to automatically play the next video in YouTube [Tip]", DotTech.org (Online), URL: https://dottech.org/174301/how-to-automatically-play-the-next-video-in-youtube-tip/, (Feb. 16, 2015), 3 pgs.
Mark, Robertson, "Watch Time: A Guide to YouTube's TOP Search Ranking Factor", Internet Article, Tubular Labs Inc., [Online] Retrieved from the Internet: <URL: https://tubularlabs.com/blog/youtube-watch-time/>, (Sep. 26, 2014), 9 pgs.
Nagaraj, S V, "Web Caching and Its Applications", Kluwer Academic Publishers, (Jun. 1, 2004), 9 pgs.
Tanenbaum, Andrew S., et al., "Distributed Systems: Principles and Paradigms (2nd Edition)", Prentice-Hall, Inc., (Oct. 12, 2006), 382 pgs.
Techlair, "How to Enable/Disable Youtube Autoplay On Android App YouTube Help", YouTube (Online), URL: https://www.youtube.com/watch?v=hgCv6PX89YA, (Jun. 29, 2016), 71 pgs; 1:09 minute video.

* cited by examiner

SELECTING CONTENT FOR HIGH VELOCITY USERS

CROSS REFERENCE TO RELATED APPLICATIONS

This application is a continuation of U.S. patent application Ser. No. 15/805,952, filed on Nov. 7, 2017, which claims priority to U.S. Provisional Application No. 62/527,832, filed on Jun. 30, 2017, and entitled "SYSTEMS AND METHODS FOR SELECTING CONTENT FOR HIGH VELOCITY USERS." The contents of these prior applications are considered part of this application, and are hereby incorporated by reference in their entireties.

TECHNICAL FIELD

The present disclosure generally relates to the technical field of managing the display of content to users of a social network. Specifically, disclosed are methods for altering the content displayed based on behavior of a user.

BACKGROUND

Social network members demonstrate diversity in their usage of the various features available to them. Some members utilize the social features extensively, exchanging messages and corresponding frequently on a one on one basis with other members. Some other members may utilize the social network to obtain news or other information, without fully utilizing the social networking features. Methods and systems to adapt to how users utilize these social networks are therefore desirable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The disclosed embodiments recognize that not all presentations of content to a user are given equal consideration by the user. Furthermore, some users may consider content more carefully than other users. One indication of the level of consideration given by a user is the speed or velocity at which the user consumes content. For example, a user selecting content at a first pace or velocity (e.g. a time delay between content selection inputs or a number of pieces of content viewed per unit of time) may be giving the content more consideration than a second user selecting content at a second faster pace.

Thus, some aspects of the disclosed methods and system consider a user's velocity of content consumption when determining what type of content to provide to the user. In some aspects, lower value content may be provided to such a user, reflecting that the content is unlikely to be given much consideration. Users having a lower velocity of content consumption may be presented with other content having a higher value in some aspects.

Figure 1:
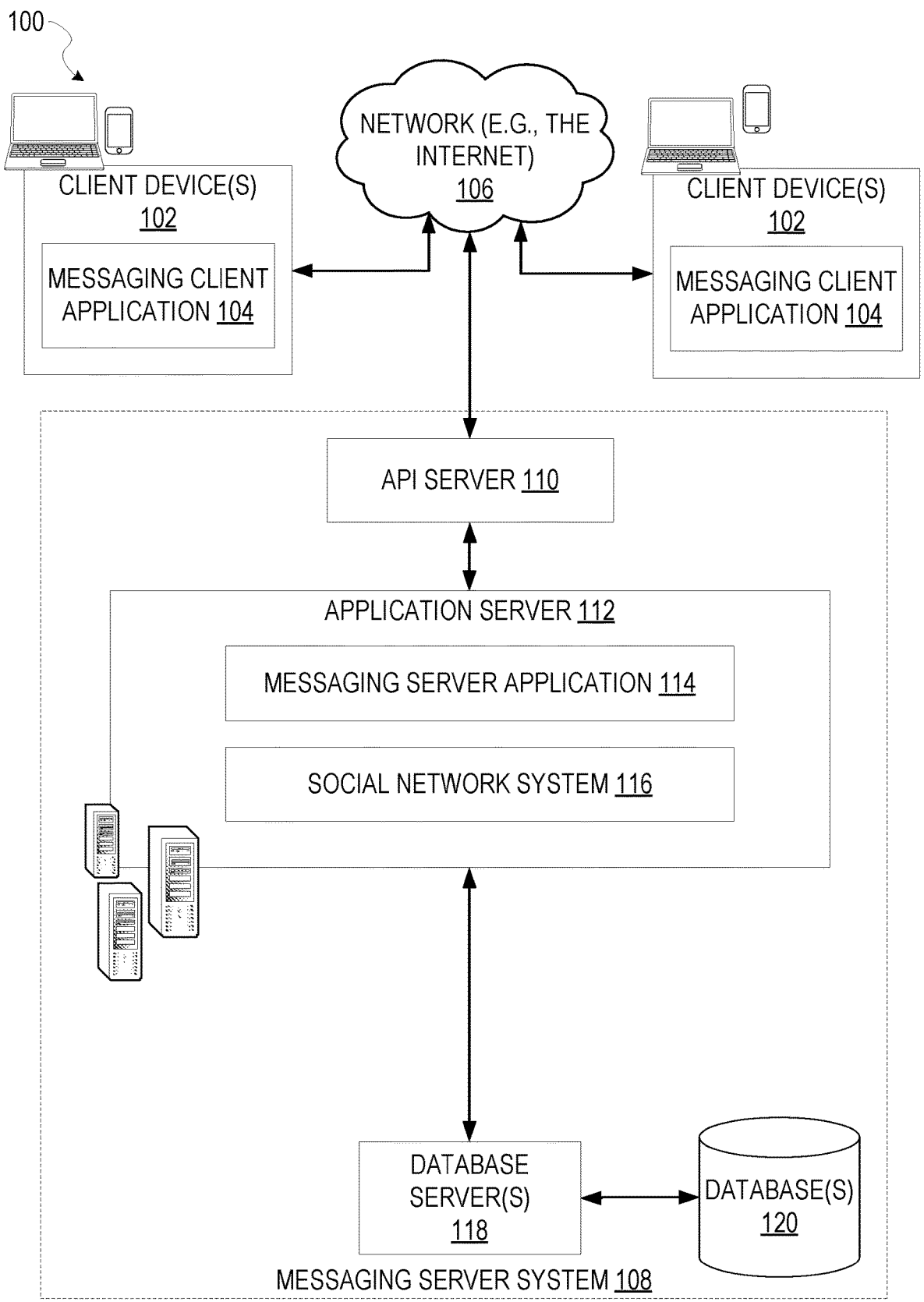
FIG. 1 is a block diagram of one aspect of a messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices 102. A client device 102 may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network 106.

In the example shown in FIG. 1, each messaging client application 104 is able to communicate and exchange data with another messaging client application 104 and with the messaging server system 108 via the network 106.

The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

In the disclosed embodiments, the social messaging system may measure a rate at which a particular user is consuming content. The rate at which the user consumes content may affect the type of content presented to that user. For example, if the user is "skimming" content, (e.g. a rate of consumption is above a predetermined threshold) it is perhaps unlikely the user is carefully considering the content as it is being presented. Thus, content presented to this user may be less likely to affect the user's behavior. By measuring the rate at which a user is consuming content, improved selection of content for presentation to the user may be achieved.

Figure 2:
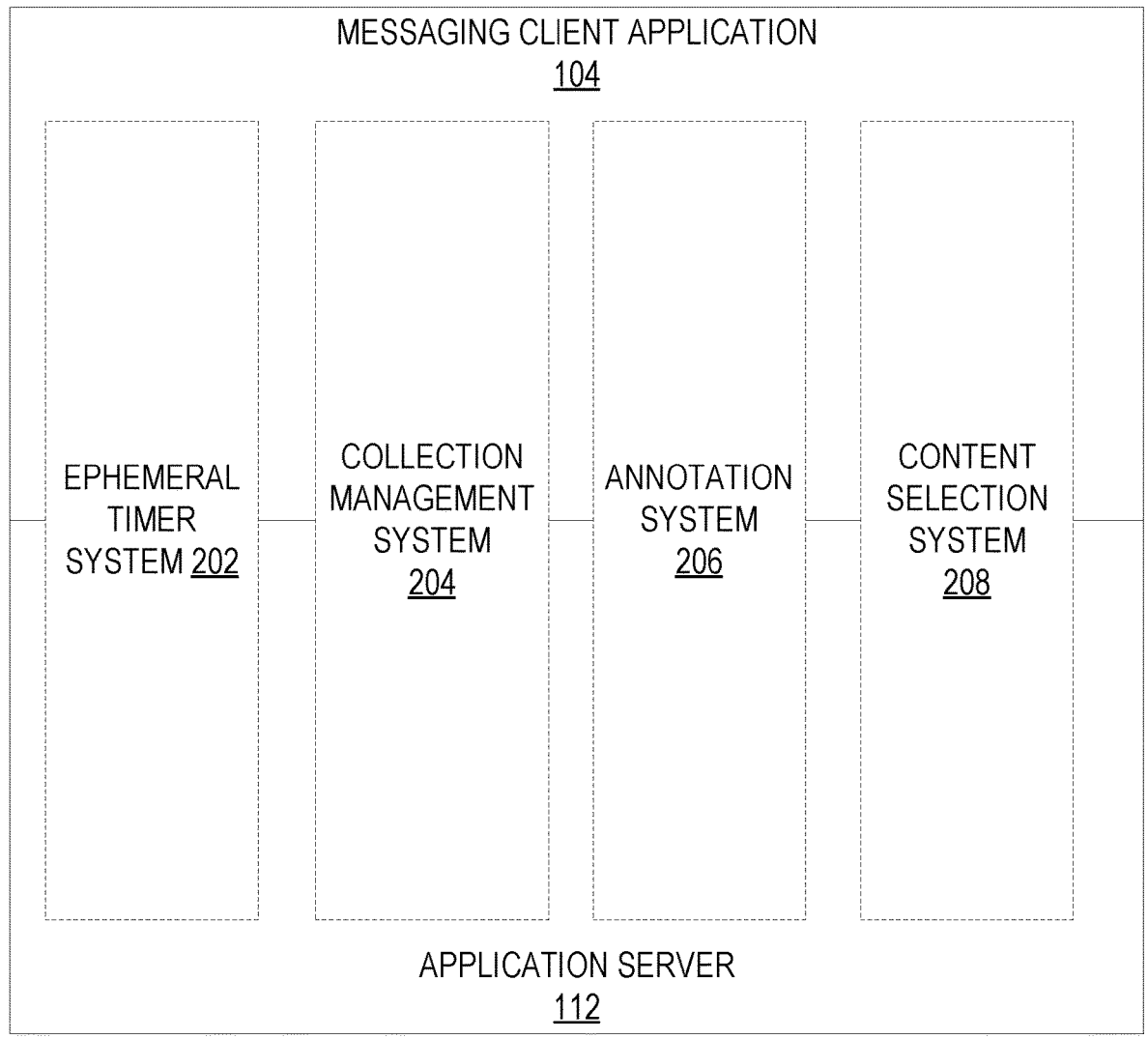
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and a content selection system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The content selection system 208 may provide for selective presentation of content to users based on a number of factors. As discussed above, users may vary in their use of the messaging system 100. A first set of users may carefully consume content provided by the messaging system 100, for example, by reading and considering each piece or a majority of information provided to them. A second set of users may "skim" substantial amounts of content provided to them, consuming content at a much more rapid rate than the first set of users. While the second set of users may consume more content than the first set of users, the second set of users may not as effectively understand the content being consumed when compared to the first set of users. As such, messages provided to the second set of users may be less effective than messages provided to the first set of users. Therefore, the messages provided to the second set of users may be less valuable when compared to the messages provided to the first set of users.

In some cases, certain types of content may be more efficiently consumed by the second set of users than other types of content. For example, more complex content, requiring more time to review and consider, may be less effectively consumed by the second set of users, as the second set of users does not allocate the time necessary to consume the complex content. Less complex content may be more effectively consumed. For example, content requiring only a brief glance to recognize a message provided by the content may be more appropriate for the second set of users than more complex content, for example, content with a multi-word text message or audio and/or video content requiring several seconds to consume.

Figure 3:
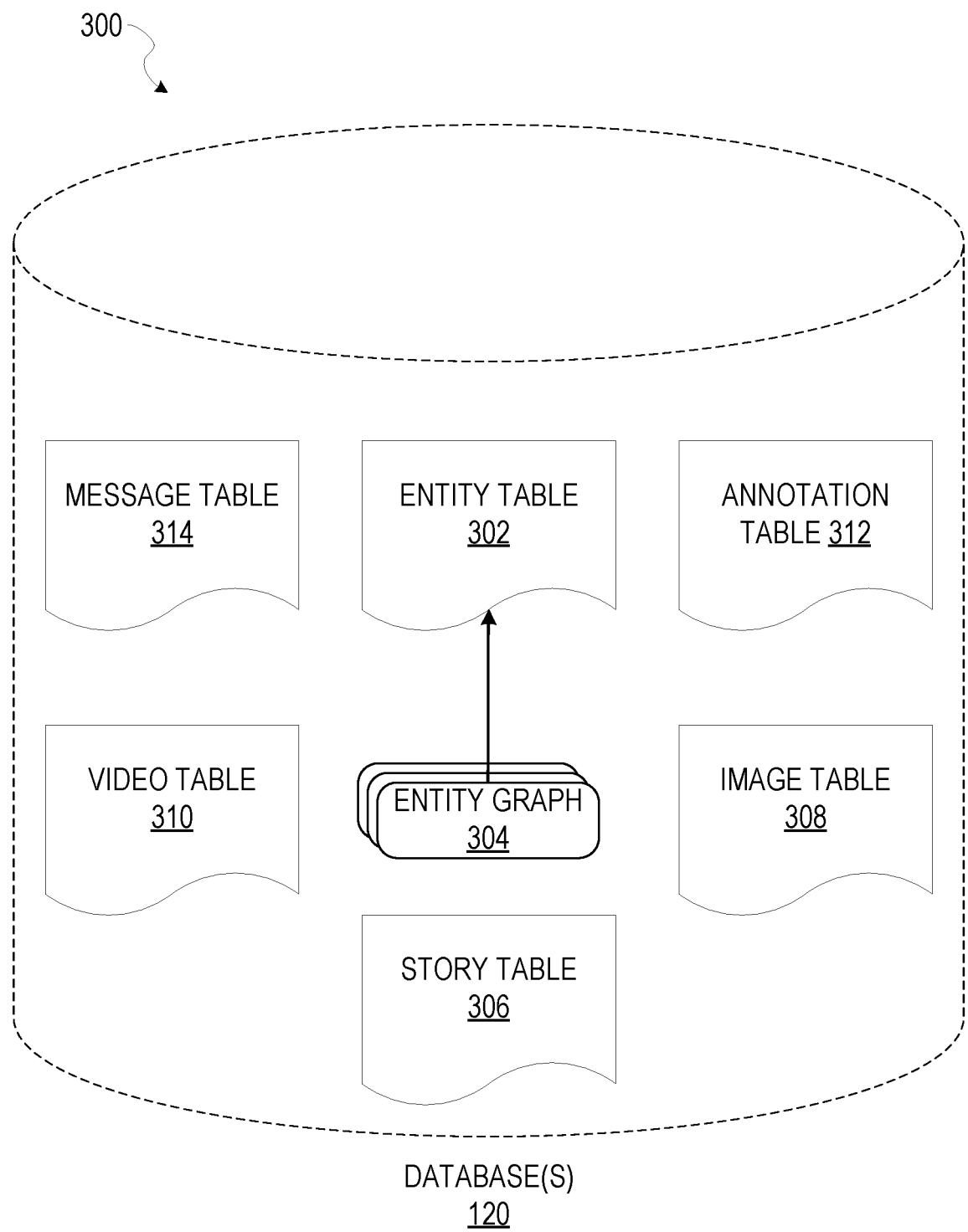
FIG. 3 is an exemplary database schema utilized by the messaging system of FIG. 1.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
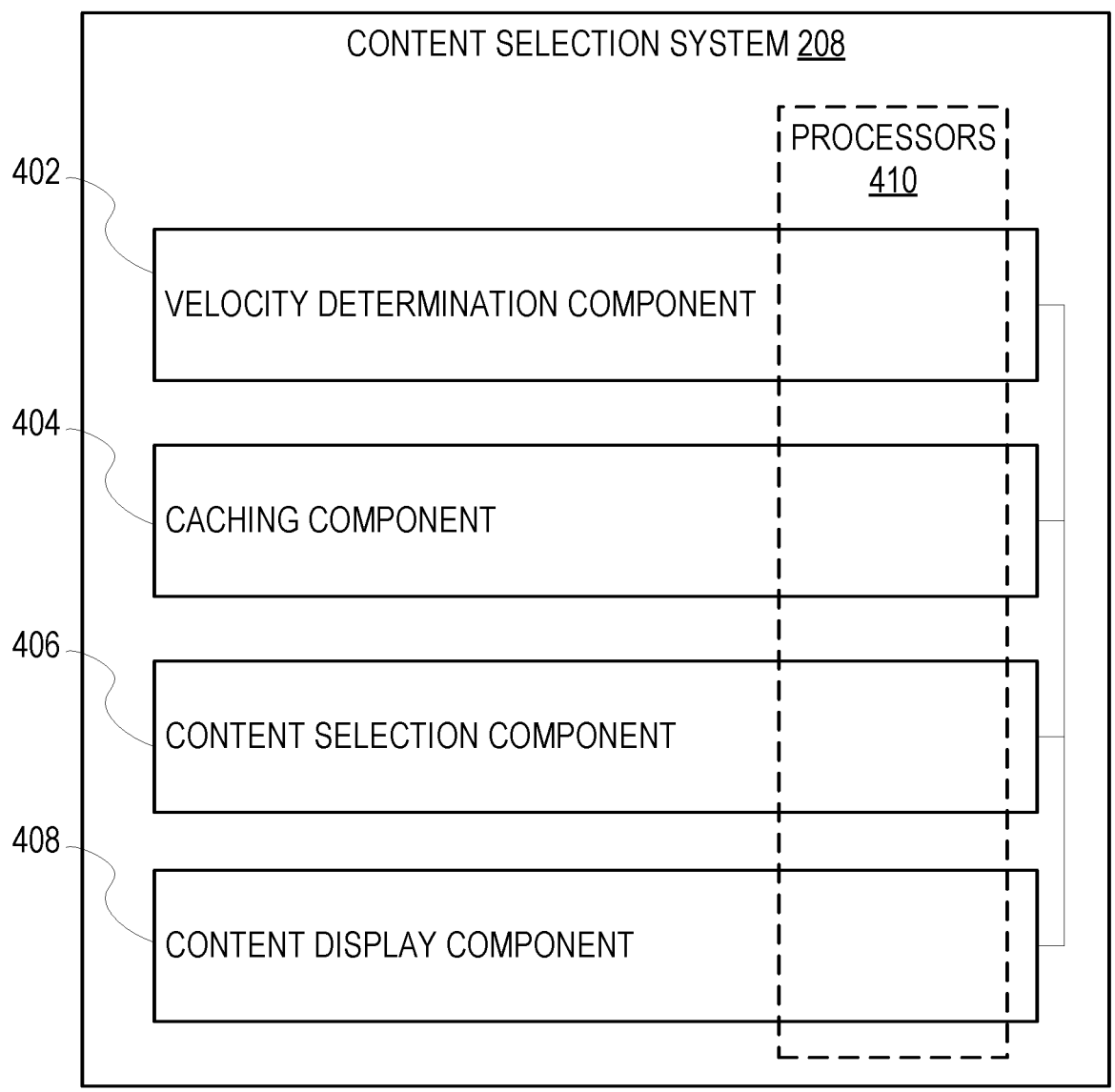
FIG. 4 is a block diagram illustrating functional components of a content selection system in some embodiments.

FIG. 4 is a block diagram illustrating functional components of the content selection system 208 that forms part of the messaging system 100, according to some example embodiments. To avoid obscuring the inventive subject matter with unnecessary detail, various functional components (e.g., modules, engines, and databases 120) that are not germane to conveying an understanding of the inventive subject matter have been omitted from FIG. 4. However, a skilled artisan will readily recognize that various additional functional components may be supported by the content selection system 208 to facilitate additional functionality that is not specifically described herein. As shown, the content selection system 208 includes a velocity determination component 402, caching component 404, content selection component 406, and a content display component 408.

The above referenced functional components of the content selection system 208 are configured to communicate with each other (e.g., via a bus, shared memory, a switch, or APIs). Collectively, these components facilitate selective presentation of content to users.

The velocity determination component 402 is responsible for determining a velocity of a user of the messaging system 100. The velocity may represent a speed at which the user is consuming content provided by the messaging system 100. For example, in some aspects, the velocity determination component 402 may measure a number of individual content impressions presented to a particular user over a period of time. Alternatively, the velocity determination component 402 may measure an elapsed time between display of content impressions and a subsequent user input requesting other content. These elapsed times may be averaged to determine an overall measurement of an amount of time the user spends with each content impression.

The caching component 404 may store content received from the application server 112. In some aspects, content may be prefetched from the application server 112 by the messaging client application 104, such that the content is available for rapid presentation to a user of the messaging system 100 when needed. By caching the content locally at the messaging client application 104, delays resulting from network latency and latencies within the application server 112 and/or database server 118 may be eliminated. In some aspects, the caching component 404 may cache different types of content simultaneously. For example, content of a first type and content of a second type may be cached simultaneously by the caching component 404. By caching at least two types of content in some aspects, these aspects may provide relatively rapid retrieval of content of either type, depending on the needs of the messaging client application 104.

The content selection component 406 may select content for display. The selection may be based, in some aspects, by a user velocity determined by the velocity determination component 402. For example, if the velocity determined by the velocity determination component 402 meets a first criterion, a certain type of content may be displayed. In some aspects, if the velocity meets the first criterion, no content may be displayed. In some aspects, if the velocity meets a second criterion, a second type of content may be displayed.

The content display component 408 may display content selected by the content selection component 406. The content display component 408 may also display content requested by the user.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the content selection system 208 may physically include an arrangement of one or more processors 410 (e.g., a subset of or among one or more processors of a machine) configured to perform the operations described herein for that component. As another example, any component of the content selection system 208 may include software, hardware, or both, that configure an arrangement of the one or more processors 410 to perform the operations described herein for that component. Accordingly, different components of the content selection system 208 may include and configure different arrangements of such processors 410 or a single arrangement of such processors 410 at different points in time.

Furthermore, the various functional components depicted in FIG. 4 may reside on a single machine (e.g., a client device 102 or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-9.

Figure 5:
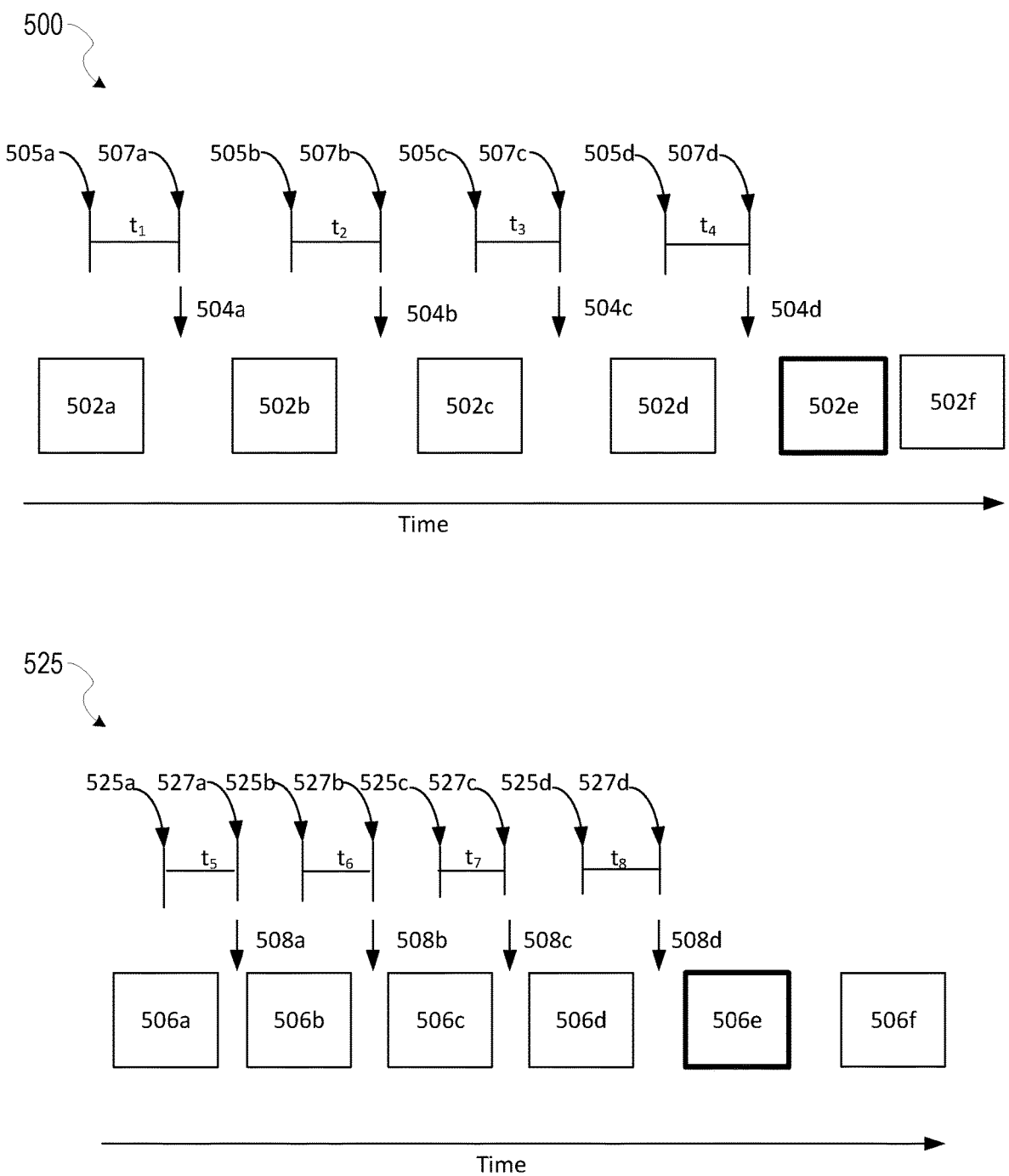
FIG. 5 shows two sequences of content display that may be implemented in some embodiments.

FIG. 5 shows two exemplary sequences of content display. The display sequence 500 shows the display of four exemplary content impressions 502a-d to a first user. While sequence 500 shows the display of content impressions 502a-d, the disclosed methods and systems may be utilized with the display of other types of content as well, such as videos, emails, text messages, instant messages, or any other type of displayed content. In some aspects, each content impression 502a-d may include multiple individual pieces of content. For example, a web page may be assembled from a variety of independent pieces of content. In some cases, these individual pieces of content may even be fetched from different remote locations to form a single content impression. In some aspects, the individual content impressions 502a-d may be defined by their formation of a single visual perception by the user. In other words, even if a content impression is comprised of multiple pieces of content, the impression is generally perceived to be a single "thing" by a viewing user.

Subsequent to the display of one or more of the content impressions 502a-d, input may be received from the first user. The exemplary user inputs are identified with arrows 504a-d. For example, after impression 502a is displayed, a user input 504a may be received. A time between a display time 505a of the impression 502a and an input time 507a of the reception of the user input 504a is shown as time $t_1$. FIG. 5 also shows display times 505b-d for images 502b-d respectively. FIG. 5 also shows input times 507b-d for inputs 504b-d respectively.

The content display component 408 may display a plurality of media content, such as content impressions 502a-d. The disclosed methods and systems may further determine a time between a display of a particular media content, such as content impression 502a, and reception of a user input such as that represented by 504a. The user input 504 may indicate the user requests additional content beyond that of image 502a. In response to receiving input 504a, the content display component 408 may display content impression 502b. Input 504b may indicate a user request for additional content beyond content impression 502b. In response, content impression 502c may be presented to the user. The velocity determination component 402 may determine an elapsed time between the display of content 502a and/or 502b, and a subsequent corresponding input 504a and 504b. This is shown as $t_1$ and $t_2$ respectively.

The velocity determination component 402 may also aggregate the elapsed times t1-t4. For example, a median or average time may be determined. In some aspects, a standard deviation between the elapsed times may also be determined. The content selection component 406 may then determine whether to display the content 502e based on the median or average time, and/or the standard deviation.

Sequence 525 includes content impressions 506a-506d displayed to a second user at display times 525a-d respectively. The second user is providing inputs 508a-d, which are received at input times 527a-d respectively. The velocity determination component 402 may measure the times t5-t8 to determine at what pace a user viewing the images 506a-d is consuming content provided by the messaging system 100. For example, times $t_5$-$t_8$ may be determined by calculating an elapsed time between display times 525a-d and input times 527a-d respectively.

FIG. 5 shows that the first user providing inputs 504a-d may be consuming content at a slower pace than the second user providing inputs 508a-d. For example, if sequences 500 and 525 are drawn to scale with respect to time, sequence 500 requires more time to consume four images 502a-d than sequence 525 requires to consume the four content impressions 506a-d. Thus, the content selection component 406 may select different types of content to display to each of the first user of sequence 500 (where content 502e is displayed) and second user of sequence 525 (where content 506e is displayed) based on differences between an aggregation of $t_1$-$t_4$ and a second aggregation of $t_5$-$t_8$. For example, the first aggregation may meet a first criteria, while the second aggregation may not meet the first criteria. This may result in selection of different content types (or selection of content in one case and selection of no content in another case) for the first and second users.

After selected content 502e is displayed in sequence 500 and content 506e is displayed in sequence 525, additional content 502f and 506f may be displayed in each of sequences 500 and 525 respectively.

Figure 6:
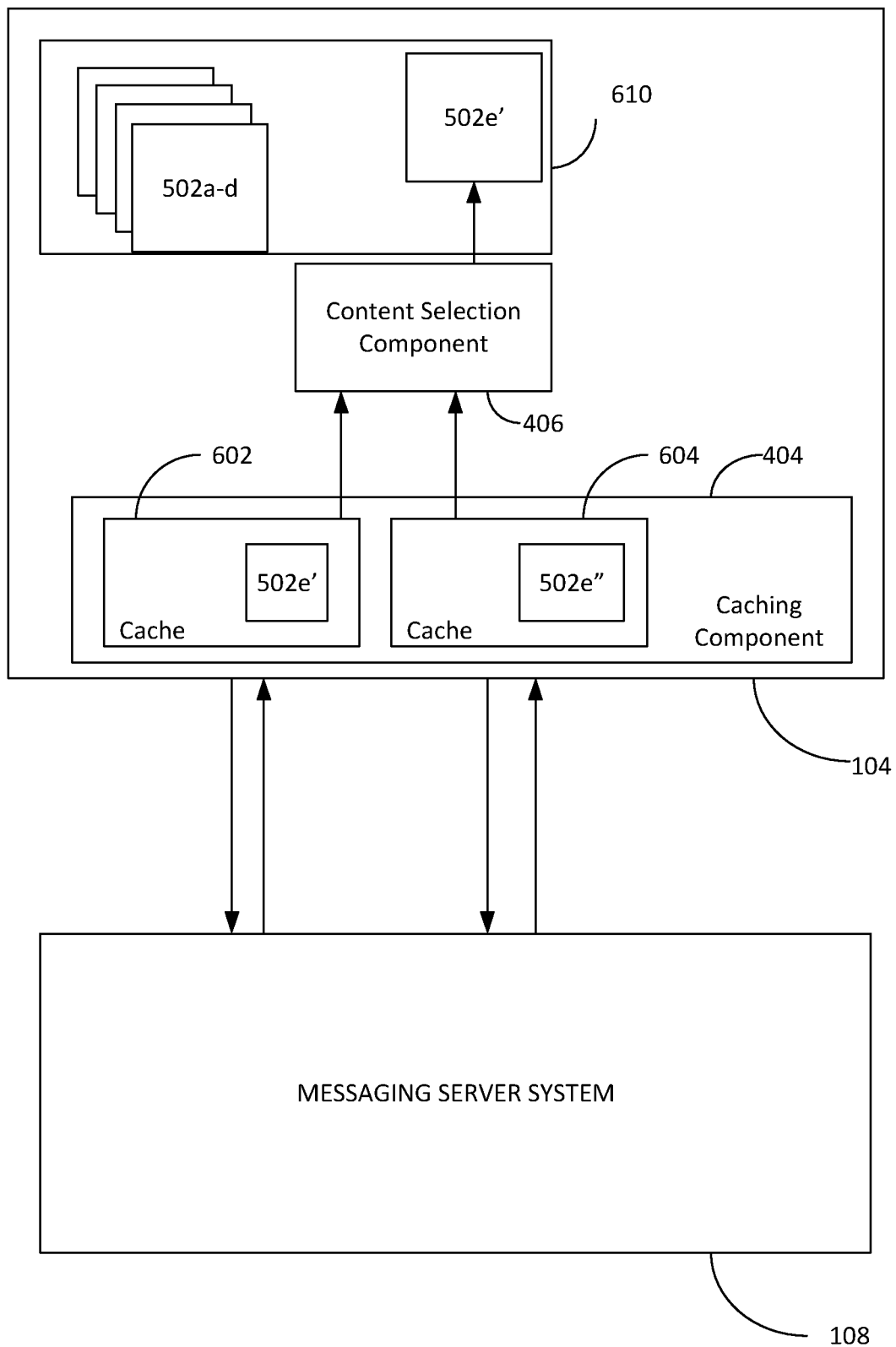
FIG. 6 is a data flow diagram for one or more of the disclosed embodiments.

FIG. 6 is an exemplary data flow diagram for one or more of the disclosed embodiments. FIG. 6 shows the messaging server system 108 and messaging client application 104 discussed above. FIG. 6 shows that the images 502a-d may be displayed on an electronic display 610 of the client device 102 via the content display component 408 and the messaging client application 104 as discussed above with respect to FIG. 5.

Within the messaging client application 104 are at least the caching component 404 and the content selection component 406. The caching component 404 includes exemplary caches 602 and 604. The cache 602 may be for a first type of content and the cache 604 may be for a second type of content. For example, a first type of content may include content that requests input from a user, while the second type of content may not request input. Alternatively, a first type of content may include content that has a number of words above a threshold, while the second type of content may include fewer words than the threshold. In some cases, the first type of content may seek to incite some action from the user to which it is presented. The action could be clicking on a link embedded in the content, or installing an application for example. The second type of content could, in some aspects, be brand awareness content, which may not request or require any user action in response to the content being presented to the user. In various embodiments, the first type of content and the second type of content may be identified in some manner. For example, in some aspects, a type identifier may be associated with each content, for example, in a database 120. The type of content is separate from the content itself, in that two separate contents that are different are not necessarily two types of content.

The content 502e' and/or 502e" may be requested from the messaging server system 108 by the messaging client application 104 via the caching component 404. In some aspects, the caching component 404 may be configured to prefetch at least one content impression of a first type, such as content 502e' and one content of a second type, such as content 502e". By caching content of each of the first and second type, the caching component 404 may be able to provide at least one of the content 502e' and/or 502e" to the content selection component 406 more quickly than could otherwise be provided if the content was fetched from the messaging server system 108 in response to a request from the content selection component 406.

The content selection component 406 may evaluate the velocity of content consumption of the images 502a-d, as described above with respect to FIG. 5, and determine whether to display content 502e' or 502e" on the display 610 based on the velocity. For example, a velocity meeting a first criteria may result in the content selection component 406 selecting the content 502', and the content 502" otherwise. The selected content 502e' may then be displayed on the display 610 by the content display component 408. In some aspects, instead of displaying content 502', no content may be selected if the first criteria is not met.

Figure 7:
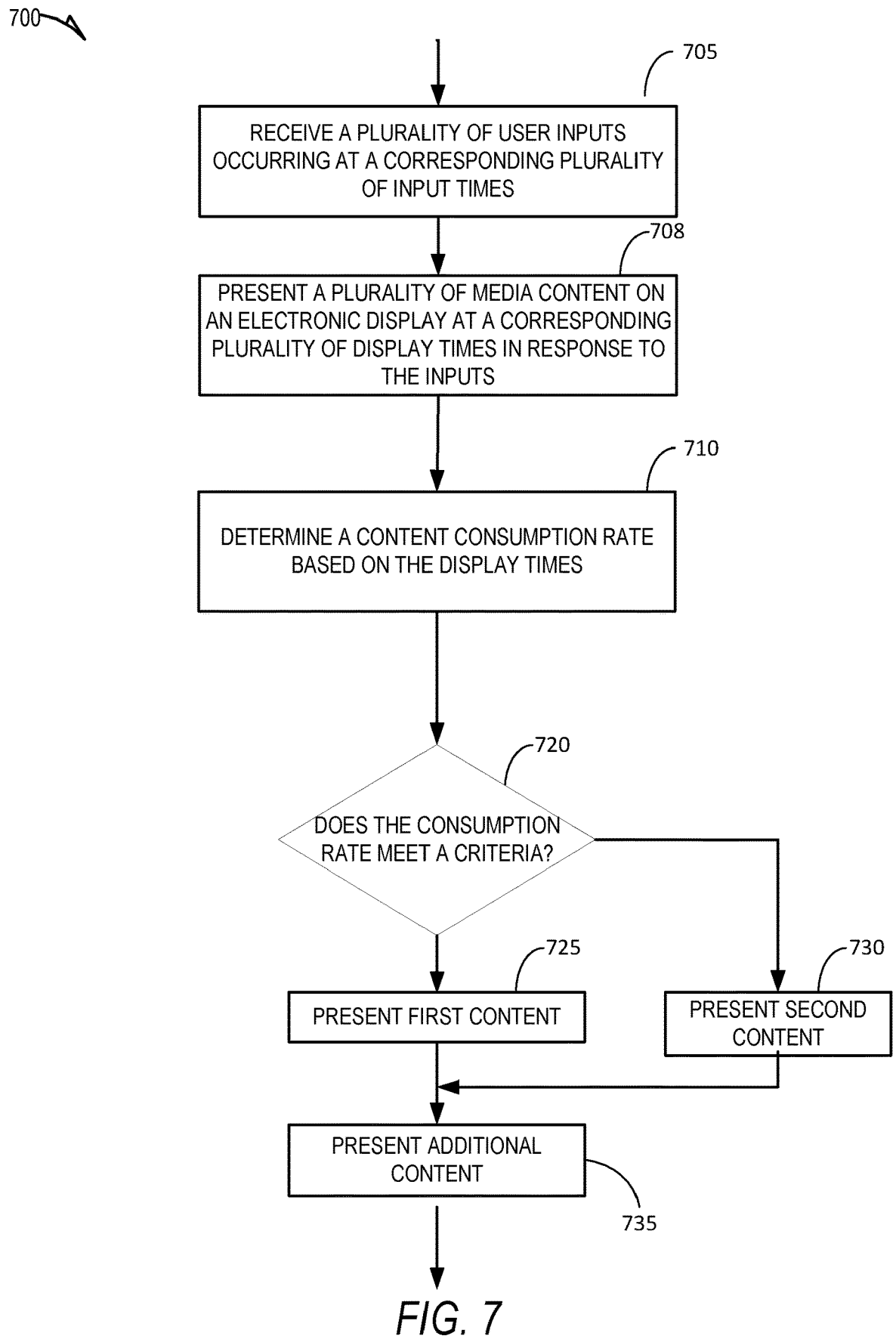
FIG. 7 is a flowchart for a method of selecting content that may be implemented in some embodiments.

FIG. 7 is a flowchart for an exemplary method of selecting content. One or more of the functions discussed below with respect to process 700 and FIG. 7 may be performed by an electronic hardware processor. For example, instructions stored in an electronic hardware memory may configure the electronic hardware processor to perform one or more of the functions discussed below. For example, in some aspects, instructions stored in the messaging client application 104, and/or one or more of the velocity determination component 402, caching component 404, content selection component 406, and/or content display component 408, may configure a hardware processor, such as the processing unit 1154 of FIG. 10 or the processor 1204 of FIG. 11 to perform one or more of the functions discussed below. In some aspects, instructions stored in the messaging server application 114 and/or social network system 116, may configure a hardware processor to perform one or more of the functions discussed below with respect to FIG. 7.

In block 705, a plurality of user inputs 504 are received. The user inputs (e.g. 504a-d) occur at a corresponding plurality of input times. For example, as discussed above with respect to FIG. 5, inputs 504a-d and/or inputs 508a-d are received at input times 507a-d and 527a-d respectively.

In block 708, a corresponding plurality of media content may be presented on an electronic display (e.g. 610). The presenting of the media content may be performed at a corresponding plurality of display times. For example, as shown in FIG. 5, media content impressions 502a-d are presented at times 505a-d respectively, and media content impressions 506a-e are presented at times 525a-e respectively.

Figure 8:
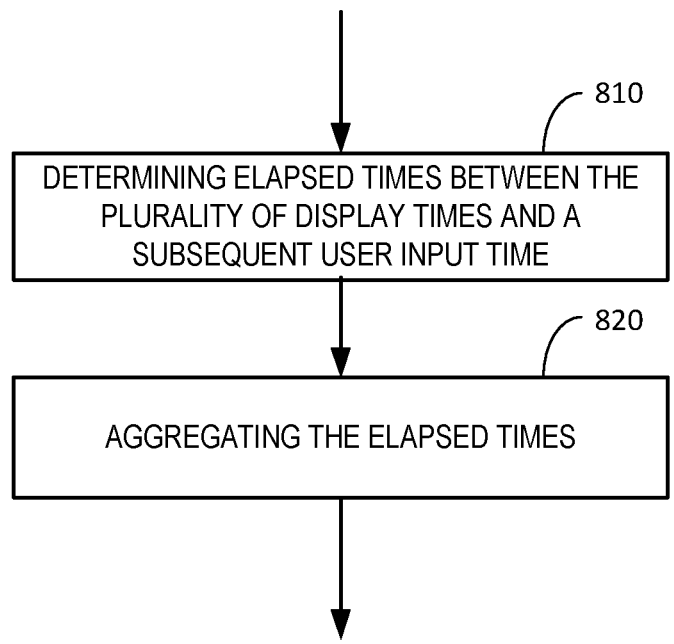
FIG. 8 is a flowchart of a method for determining a content consumption rate in some aspects.

In block 710, a content consumption rate is determined based on the display times. In some aspects, block 710 may determine a number of media content impressions 506a-e displayed over an elapsed time. For example, in some aspects, block 710 may determine an elapsed time between display time 505a and input time 504d or display time 505d, and determine how may content impressions were displayed during that time. For example, in the example of sequence 500 discussed above with respect to FIG. 5, some implementations would identify four media content impressions 502a-d consumed between display time 505a and input time 504d or display time 505d. The rate may then be determined by dividing the number of displayed media content impressions 506a-d by the elapsed time. In some aspects, block 710 may be performed by the client device 102. In other aspects, block 710 may be performed by the application server 112, and in some aspects, by either the messaging server application 114 or the social network system 116. For example, in some aspects, statistics regarding the timing of user inputs (e.g. 504a-d) and presentation of content to the user may be transmitted by the client device 102 to the application server 112. For example, in some aspects, individual messages may be transmitted from the client device 102 to the application server 112 whenever, or in response to, a user request for content and/or when content is displayed to the user. From these messages, the application server 112, or one of the included components such as the messaging server application 114 or social network system 116, may determine the content consumption rate, for example, in some aspects, based on the timing of the received messages and/or in other aspects based on statistics included in the messages. FIG. 8 provides an alternate method of determining a content consumption rate.

Decision block 720 determines whether the aggregated elapsed times meet a criterion. For example, decision block 720 may determine whether the aggregated elapsed time is below a threshold. For example, as discussed above with respect to FIG. 5, some users may consume content at a faster rate than other users. Users that consume content at a fast rate may result in aggregated elapsed times below a threshold. The content selection component 406 may select a certain type of content for display to these users (or no content in some aspects) based on the aggregated time being below the threshold. If the aggregated elapsed time meets the criteria, process 700 moves to block 725, which presents a first media content impression on an electronic display 610. Otherwise, process 700 moves to block 730, which may present a second media content impression on the electronic display (e.g. 610). Alternatively, block 730 may not present any content on the display (e.g. 610). The display of first or second content in blocks 725 and 730 respectively may substantially effect operation of a computer performing process 700. For example, each of the first and second content presented in either blocks 725 or 730, respectively, may receive different sets of input from a user, and may generate completely different responses based on the input. As one example, the first content impression may be presented in a user interface configured to receive input indicating a first program should be executed, while the second content impression may be presented in a second user interface configured to receive input indicating a second program should be executed. Thus, based on differences between the first and second programs, the operation of the computer could vary depending on whether the first or second content impression is presented in innumerable ways. For example, in some aspects, the first program may install a $3^{rd}$ party application, while the second program may open a URL in a web browsing application.

In block 735, additional content (e.g. 502f or 506f) may be presented on the electronic display (e.g. 610). As discussed above with respect to FIG. 5, after the content selection component 406 determines a type of content to present based on a velocity of a user, and the selected content is displayed (e.g. 502e or 506e) (or no content is displayed), additional content such as content 502f or 506f may be displayed. In some aspects, the additional content 502f and 506f may be presented in a user interface configured to accept input having a number of different possible types. Depending on the type of input, further computer operations may be initiated. In some aspects, block 735 includes transmitting one or more network messages indicating the additional content 502f and 506f from the application server 112 to the client device 102. In some aspects, the network message may include data defining the content. In other aspects, the network message may identify content, for example, located in the database 120. In these aspects, the client device 102 may then fetch the indicated content from the database 120 in response to receiving the network message.

FIG. 8 is an exemplary method for determining a content consumption rate. One or more of the functions discussed below with respect to process 710 and FIG. 8 may be performed by an electronic hardware processor. For example, instructions stored in an electronic hardware memory may configure the electronic hardware processor to perform one or more of the functions discussed below. For example, in some aspects, instructions stored in the messaging client application 104, and/or the velocity determination component 402, may configure a hardware processor, such as the processing unit 1154 of FIG. 10 or the processor 1204 of FIG. 11 to perform one or more of the functions discussed below.

In block 810, elapsed times are determined between each of the plurality of display times and a subsequent user input time. In some aspects, each elapsed time may be considered an amount of time a user viewed the respective displayed content. For example, as shown in FIG. 5, times $t_1$-$t_4$ may be determined based on the differences between display times 505a-d and input times 507a-d respectively. Similarly, times $t_5$-$t_8$ may be determined based on differences between display times 525a-d and input times 527a-d. Times $t_1$-$t_4$ and/or elapsed times $t_5$-$t_8$ may be considered view times in some aspects.

In some aspects, content presented to a user may be ephemeral content as described above. In some aspects, a view time of ephemeral content may be determined differently than content of, for example, static content that may be displayed for an indefinite period of time depending on user input (e.g. 504). For example, in some aspects, a user may rapidly consume ephemeral content. In some of these aspects, the rapid consumption of the ephemeral content may be a result of a limited access time available for each of the ephemeral content impression. For example, as discussed above, ephemeral timers may control for how long access to content is available, and/or how long a particular ephemeral content impression may be displayed.

Thus, in some aspects, if a user consumes one or more ephemeral content impression, each with an access time of (e.g.) two seconds (limited by the ephemeral timers), a consumption rate determined based on this content may inaccurately characterize the user attentiveness and receptivity to additional content (e.g. 502f or 506f), such as content of the first type and/or the second type discussed above. Thus, in some aspects, a view time of ephemeral content may be determined differently than a view time of static content. For example, in some aspects, a view time of ephemeral content may not be included in block 810's determination of a content consumption rate. In other aspects, ephemeral content with an availability time above an availability time threshold may be included in the content consumption rate determination of block 810, while ephemeral content with an availability time below or equal to the threshold may not be included in the consumption rate determination. In some aspects, ephemeral content may be included in the content consumption rate if a user input (e.g. 504a-d) caused presentation of other content before the ephemeral content's timer ran down and ended access to and/or display of the ephemeral content. In aspects that exclude particular ephemeral content, a time utilized to display the particular ephemeral content may not be considered in time calculations of block 810.

In block 820, the elapsed times are aggregated. In some aspects, aggregating the elapsed times may include determining a median of the elapsed times and/or an average of the elapsed times. In some aspects, a standard deviation of the elapsed times may also be determined. In some aspects, the aggregated elapsed time is determined by finding the median of the elapsed times or averaging the elapsed times and adding one (1), two (2), or three (3) standard deviations to the average or median value.

The aggregated value determined by block 820 may be considered a consumption rate in block 710 of FIG. 7, in some aspects.

Figure 9:
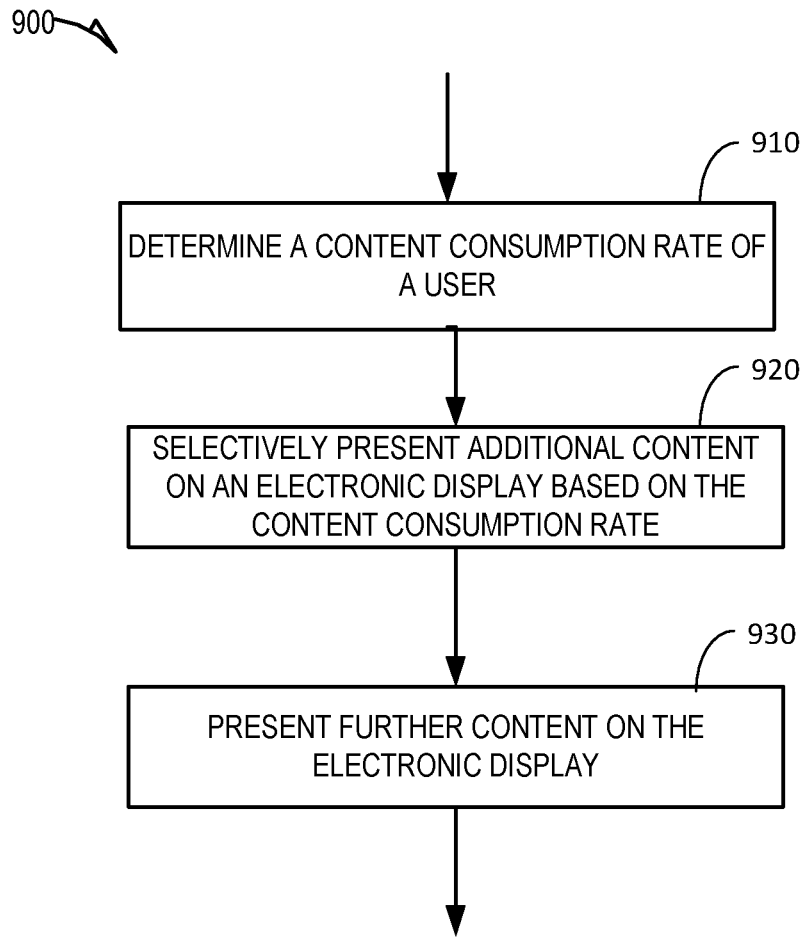
FIG. 9 is a flowchart of a method of conditional presentation of content to a user that may be implemented in some embodiments.

FIG. 9 is a flowchart of an exemplary method of conditional presentation of content to a user. One or more of the functions discussed below with respect to process 900 and FIG. 9 may be performed by an electronic hardware processor. For example, instructions stored in an electronic hardware memory may configure the electronic hardware processor to perform one or more of the functions discussed below. For example, in some aspects, instructions stored in the messaging client application 104, and/or one or more of the velocity determination component 402, caching component 404, content selection component 406, and/or content display component 408, may configure a hardware processor, as the processing unit 1154 of FIG. 10 or the processor 1204 of FIG. 11, to perform one or more of the functions discussed below. In some aspects, process 900 may be a generalized form of process 700, discussed above with respect to FIG. 7. For example, block 910 of process 900 may encompass blocks 705-710 of process 700, in some aspects. Block 920 of process 900 may encompass blocks 720-730 of process 700, in some aspects. Block 930 may include, in some aspects, one or more of the functions discussed above with respect to block 735.

In block 910, a content consumption rate for a user is determined. The consumption rate may be determined by an electronic device. For example, the consumption rate may be determined by a client device, such as client device 102 discussed above with respect to FIG. 1. In some aspects, the consumption rate is a rate at which a device is displaying content on an electronic display (e.g. 610). The rate may be based on an amount of data displayed per unit of time, or a number of unique "impressions" displayed per unit of time. The impressions may be defined, in some aspects, as a single fixed display state for the content. In some aspects, block 910 may include one or more of the functions discussed above with respect to blocks 705-710.

In some aspects, determining the content consumption rate includes receiving a plurality of user inputs (e.g. 504a-d), each input requesting a presentation of media content, determining an elapsed time of the plurality of user inputs (e.g. 504a-d) and determining the consumption rate based on a number of the plurality of user inputs (e.g. 504a-d) and the elapsed time. For example, as discussed above with respect to FIG. 5, each of the inputs 504a-d may be received. An elapsed time across the inputs, for example, between inputs 504a and 504d may be determined. Furthermore, a number of content impressions may be determined for the inputs 504a-d. For example, images 502b-d and either 502e or 502f may result from the inputs 504a-d. Thus, four impressions or content presentations result from the considered inputs. The consumption rate may, in some aspects, be determined by the number of content impressions divided by the elapsed time to provide the impressions.

In some aspects, block 910 may include receiving a plurality of user inputs, each input requesting a presentation of media content, presenting, in response to each user input, a corresponding media content impression on an electronic display, determining a plurality of view times of each of the presented media content impression, aggregating the plurality of view times, and determining the consumption rate based on the aggregated view times. In some aspects, determining the view time for each of the presented media content impression includes determining an elapsed time between presentation of the presented media content and a subsequent one of the plurality of user inputs. In some aspects, aggregating the plurality of view times includes determining an average or a median of the measured view times. Block 910 also may include selectively presenting the first type of media content based on the average or median. In some aspects, aggregating the plurality of view times includes determining a standard deviation for the plurality of view times.

In block 920, additional content (e.g. 502f or 506f) is selectively presented on an electronic display based on the content consumption rate. In some aspects, if the content consumption rate meets a first criteria, a first type of content may be provided. Otherwise, a second type of content, or potentially no content, may be provided. In some aspects, two or more content sources are used for the two or more types of content. For example, in some aspects, separate databases may be utilized for different types of content. Alternatively, each content may have an associated type identifier, for example, in a content database. The type identifier for the content may be separate and distinct from the content itself. Each content in the content database may have a separate but associated type identifier. In these aspects, selecting a first type of content may include searching the database 120 for content associated with a type identifier indicating the first type, while selecting a second type of content may include searching the database 120 for content associated with a type identifier indicating the second type.

In some aspects, the first type of content is presented when the consumption rate is below or above a threshold, and the second type of content or no content is provided otherwise. In some aspects, the first type of media content is selected for presentation if the average or median meets a first criteria. In some aspects, the first type of media content is selected for presentation if the average or median and the standard deviation meet the first criteria. Some aspects include determining the average or median meets the first criteria if the average or median is above a threshold. In some aspects, the threshold is determined based on one or more characteristics of a user. For example, younger users (age below or equal to an age threshold) may utilize higher rate thresholds than older users (age above the age threshold). In some aspects, the threshold may be determined based on a gender of the user or a number of friends in the social network of the user.

As described above with respect to FIG. 6, the selectively presented content may be, in some aspects, retrieved from a local cache, such as cache 602 or cache 604. The caching of the selectively presented content may provide for improved performance relative to solutions that would fetch selectively presented content on-demand from a network server, such as the messaging server system 108. In some aspects, process 900 includes pre-populating the cache (e.g. 602 and/or 604) with the first type of content and/or prepopulating a second cache with the second type of content. The prepopulating of the cache may be accomplished by requesting the first and/or second types of content from a remote server over a network, such as the messaging server system 108, before the selective presentation of the content, and potentially before the determination of the consumption rate itself. A response to the request(s) may then be received, with the responses including the requested first and/or second type(s) of content. The content may then be written to the cache to accomplish the pre-population.

In block 930, further content is presented on the electronic display. This additional content may be presented regardless of the consumption rate determined in block 910. Thus, in one example embodiment, a user may request "N" media content at a first rate determined in block 910. If the rate is higher than a threshold, block 920 may determine to not display any content. Additional content may then be presented in block 930. A second user may request "N" media content at a second rate slower than the first rate. For this user, block 920 may determine to display content of the first type. Block 930 may then display additional content to the second user. Thus, in this simple example, the second user may be presented with more content than the first user, even though both users requested the same number "N" of media content. In some aspects, block 930 may include one or more of the functions discussed above with respect to block 735.

Software Architecture

Figure 10:
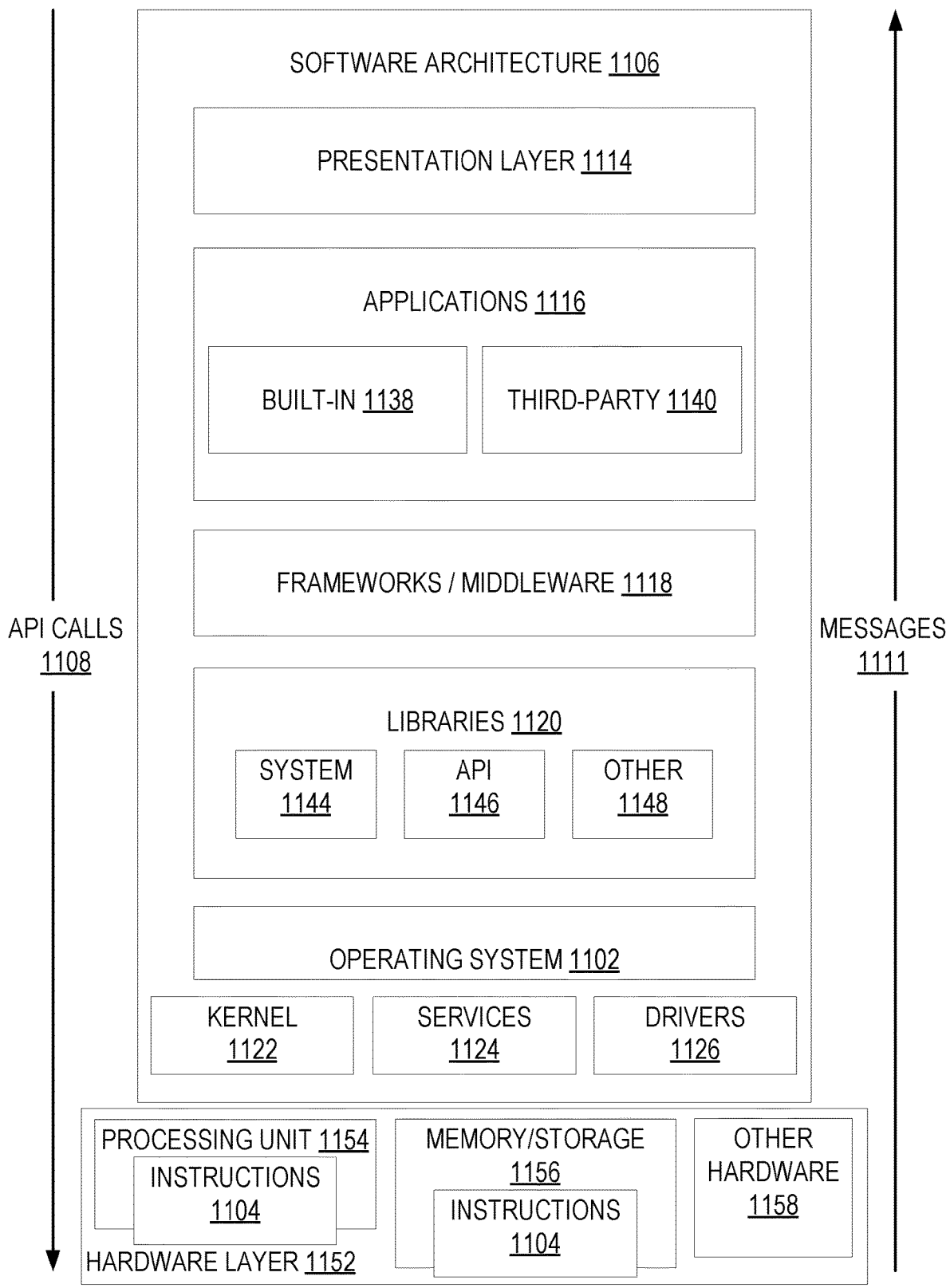
FIG. 10 is a block diagram illustrating a software architecture for some aspects disclosed.

FIG. 10 is a block diagram illustrating an example software architecture 1106, which may be used in conjunction with various hardware architectures herein described. FIG. 10 is a non-limiting example of a software architecture and it will be appreciated that many other architectures may be implemented to facilitate the functionality described herein. The software architecture 1106 may execute on hardware such as a machine 1100 of FIG. 11 that includes, among other things, processors 1204, memory/storage 1206, and I/O components 1218. A representative hardware layer 1152 is illustrated and can represent, for example, the machine 1200 of FIG. 11. The representative hardware layer 1152 includes a processing unit 1154 having associated executable instructions 1104. The executable instructions 1104 represent the executable instructions of the software architecture 1106, including implementation of the methods, components, and so forth described herein. The hardware layer 1152 also includes memory and/or storage 1156, which also have the executable instructions 1104. The hardware layer 1152 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions 1210 contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 10, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response as messages 1110. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than by interfacing directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. The third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as the operating system 1102) to facilitate functionality described herein.

The applications 1116 may use built-in operating system functions (e.g., kernel 1122, services 1124, and/or drivers 1126), libraries 1120, and frameworks/middleware 1118 to create user interfaces to interact with users of the system. Alternatively, or additionally, in some systems interactions with a user may occur through a presentation layer, such as the presentation layer 1114. In these systems, the application/component "logic" can be separated from the aspects of the application/component that interact with a user.

Exemplary Machine

Figure 11:
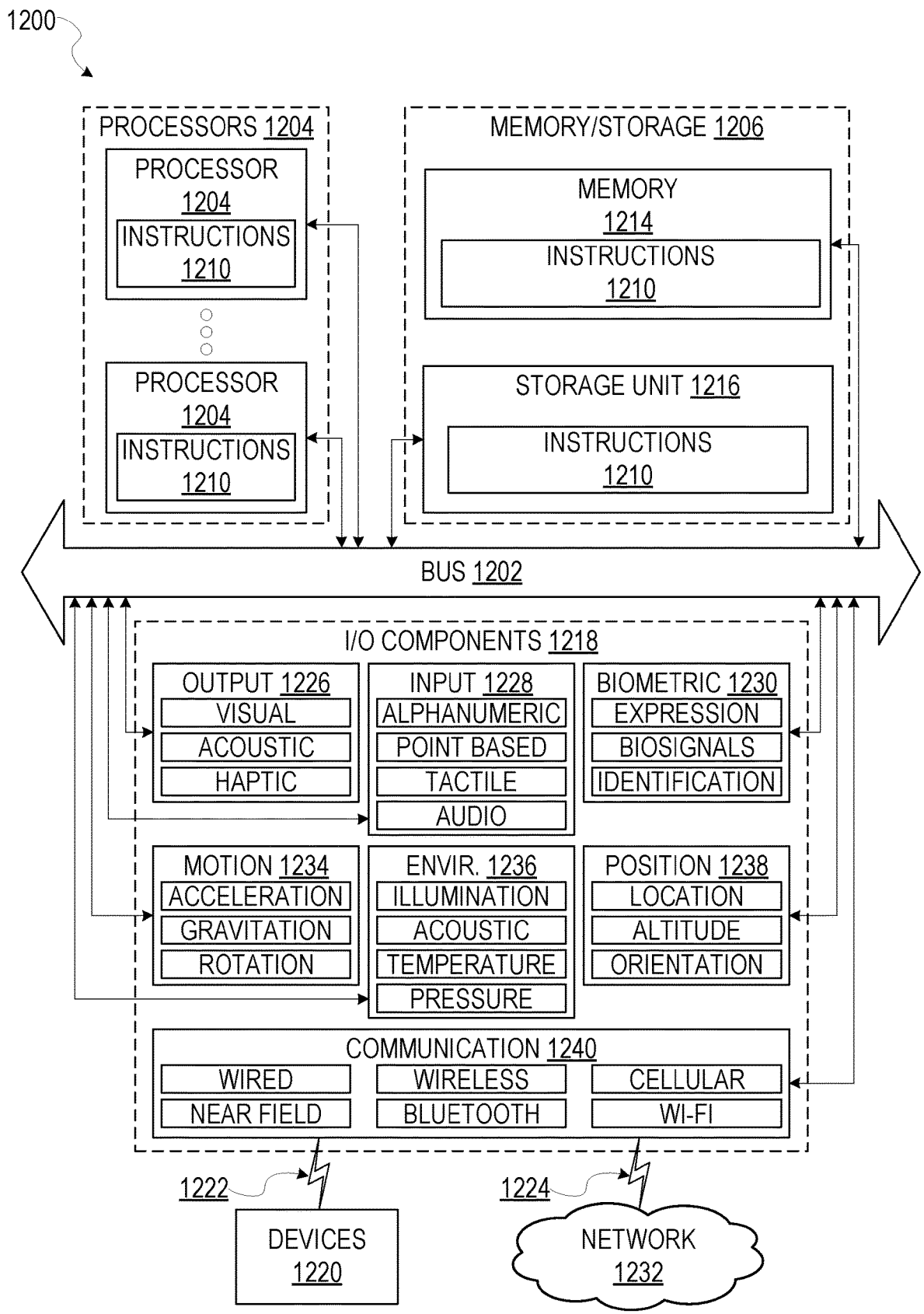
FIG. 11 is a block diagram illustrating components (also referred to herein as "modules") of a machine that may be included, in some embodiments.

FIG. 11 is a block diagram illustrating exemplary components (also referred to herein as "modules") of a machine 1200. In some aspects, the machine 1200 is configured to read instructions from a machine-readable medium (e.g., a machine-readable storage medium) and perform any one or more of the methodologies discussed herein. Specifically, FIG. 11 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of the processors 1204 are examples of machine-readable media.

As used herein, the term "machine-readable medium," "computer-readable medium," or the like may refer to any component, device, or other tangible medium able to store instructions 1210 and data temporarily or permanently. Examples of such media may include, but are not limited to, random-access memory (RAM), read-only memory (ROM), buffer memory, flash memory, optical media, magnetic media, cache memory, other types of storage (e.g., electrically erasable programmable read-only memory (EEPROM)), and/or any suitable combination thereof. The term "machine-readable medium" should be taken to include a single medium or multiple media (e.g., a centralized or distributed database, or associated caches 602 or 604 and servers) able to store instructions 1210. The term "machine-readable medium" may also be taken to include any medium, or combination of multiple media, that is capable of storing instructions 1210 (e.g., code) for execution by a machine 1200, such that the instructions 1210, when executed by one or more processors 1204 of the machine 1200, cause the machine 1200 to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1218 may include a wide variety of components to provide a user interface for receiving input, providing output, producing output, transmitting information, exchanging information, capturing measurements, and so on. The specific I/O components 1218 that are included in the user interface of a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 11. The I/O components 1218 are grouped according to functionality merely for simplifying the following discussion and the grouping is in no way limiting. In various exemplary embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1228 may also include one or more image-capturing devices, such as a digital camera for generating digital images and/or video.

In further exemplary embodiments, the I/O components 1218 may include biometric components 1230, motion components 1234, environment components 1236, or position components 1238, as well as a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via a coupling 1224 and a coupling 1222, respectively. For example, the communication components 1240 may include a network interface component or other suitable device to interface with the network 1232. In further examples, the communication components 1240 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP, INC., All Rights Reserved.

We claim:

1. A method of displaying content, comprising:
   causing presentation of a plurality of media content items;
   determining a plurality of view times of each presented media content item, the plurality of view times being determined by determining an elapsed time between presentation of the presented media content items and a subsequent one of a plurality of user inputs;
   determining that the plurality of media content items includes a media content item with an availability time that is less than a threshold amount of time;
   computing a content consumption rate based on the plurality of view times and responsive to determining that the plurality of media content items includes the media content item with the availability time that is less than the threshold amount of time;
   determining an elapsed time of the plurality of user inputs that respectively request presentation of media content items;
   determining the content consumption rate further based on a number of the plurality of user inputs and the elapsed time; and
   selecting additional content to present to a user based on the content consumption rate.

2. The method of claim 1, further comprising:
   determining an average or median of the plurality of view times; and
   presenting the additional content to the user based on the average or median.

3. The method of claim 1, further comprising presenting, as the additional content, a first content item of a first type having a first complexity to the user when the content consumption rate meets a first criterion and presenting a second content item of a second type having a second complexity, the second complexity being more complex than the first complexity, the first and second complexities representing an amount of time required by a user to review, consider or consume content.

4. The method of claim 3, wherein the first type of content includes content that has a number of words above a threshold, and wherein the second type of content includes content that includes fewer words than the threshold.

5. The method of claim 3, wherein a first amount of time needed to consume the first type of additional content is greater than a second amount of time needed to consume the second type of additional content.

6. The method of claim 1, further comprising:
   presenting, in response to each user input, a corresponding media content item on an electronic display;
   aggregating the plurality of view times; and
   determining the content consumption rate based on the aggregated view times.

7. The method of claim 6, further comprising aggregating the plurality of view times.

8. The method of claim 7, further comprising determining an average or a median of the plurality of view times and presenting the additional content of a first type based on the average or median.

9. The method of claim 8, further comprising selecting the additional content of the first type for presentation if the average or median meets a first criterion.

10. The method of claim 9, further comprising selecting the additional content of the first type presentation if the average or median and a standard deviation meet the first criterion.

11. The method of claim 9, further comprising determining the average or median meets the first criterion if the average or median is above a threshold.

12. The method of claim 11, further comprising determining the threshold based on one or more characteristics of a user.

13. The method of claim 1, further comprising excluding, from computing the content consumption rate, a view time of the content item having the availability time that is less than the threshold amount of time from the content consumption rate.

14. The method of claim 1, further comprising including the view time of the media content item having the availability time that is less than the threshold amount of time in computing the content consumption rate in response to detecting a user input during presentation of the media content item.

15. The method of claim 14, further comprising:
    starting a timer when the media content item is presented to the user; and
    determining that the user input is received before the timer reaches the threshold amount of time.

16. A client device, comprising:
    an electronic hardware processor, configured to perform operations comprising:
    causing presentation of a plurality of media content items;
    determining a plurality of view times of each presented media content item, the plurality of view times being determined by determining an elapsed time between presentation of the presented media content items and a subsequent one of a plurality of user inputs;
    determining that the plurality of media content items includes a media content item with an availability time that is less than a threshold amount of time;
    computing a content consumption rate based on the plurality of view times and responsive to determining that the plurality of media content items includes the media content item with the availability time that is less than the threshold amount of time;
    determining an elapsed time of the plurality of user inputs that respectively request presentation of media content items;
    determining the content consumption rate further based on a number of the plurality of user inputs and the elapsed time; and
    selecting additional content to present to a user based on the content consumption rate.

17. The client device of claim 16, the operations comprising including the view time of the media content item having the availability time that is less than the threshold amount of time in computing the content consumption rate in response to detecting a user input during presentation of the media content item.

18. The client device of claim 16, further comprising hardware memory including a first cache and a second cache, wherein the electronic hardware processor is further configured to retrieve the additional content of a first type from a first cache and retrieve the additional content of a second type from a second cache.

19. A non-transitory computer readable medium comprising instructions that, when executed, cause an electronic hardware processor to perform a method of content selection, the method comprising:
- causing presentation of a plurality of media content items;
- determining a plurality of view times of each presented media content item, the plurality of view times being determined by determining an elapsed time between presentation of the presented media content items and a subsequent one of a plurality of user inputs;
- determining that the plurality of media content items includes a media content item with an availability time that is less than a threshold amount of time;
- computing a content consumption rate based on the plurality of view times and responsive to determining that the plurality of media content items includes the media content item with the availability time that is less than the threshold amount of time;
- determining an elapsed time of the plurality of user inputs that respectively request presentation of media content items;
- determining the content consumption rate further based on a number of the plurality of user inputs and the elapsed time; and
- selecting additional content to present to a user based on the content consumption rate.

20. The non-transitory computer readable medium of claim 19, wherein determining the content consumption rate comprises determining a number of media content items presented to the user on an electronic display within a period of time and determining the content consumption rate based on the number.

* * * * *

UNITED STATES PATENT AND TRADEMARK OFFICE
CERTIFICATE OF CORRECTION

PATENT NO. : 11,595,489 B2
APPLICATION NO. : 17/215128
DATED : February 28, 2023
INVENTOR(S) : Lonkar et al.

Page 1 of 1

It is certified that error appears in the above-identified patent and that said Letters Patent is hereby corrected as shown below:

On the Title Page

On page 2, in Column 2, under "Other Publications", Line 8, delete ""Europears" and insert --"European-- therefor On page 2, in Column 2, under "Other Publications", Line 10, delete "Applicalion" and insert --Application-- therefor On page 2, in Column 2, under "Other Publications", Line 20, delete "Applicalion" and insert --Application-- therefor Signed and Sealed this
Fifth Day of March, 2024

Katherine Kelly Vidal
*Director of the United States Patent and Trademark Office*